United States Patent [19]

Krause

[11] Patent Number: 5,555,293
[45] Date of Patent: Sep. 10, 1996

[54] OPTICALLY-COUPLED DATA ACCESS ARRANGEMENT AND TRANSHYBRID

[75] Inventor: Robert Krause, Menlo Park, Calif.

[73] Assignee: Siemens Components, Inc., Cupertino, Calif.

[21] Appl. No.: 409,562

[22] Filed: Mar. 23, 1995

Related U.S. Application Data

[62] Division of Ser. No. 191,841, Feb. 4, 1994.

[51] Int. Cl.$^6$ .................................................. H04M 11/00
[52] U.S. Cl. ........................... 379/98; 379/399; 379/412; 379/402; 379/405
[58] Field of Search .................................. 379/377, 398, 379/399, 402, 405, 406, 412, 90, 93, 98; 375/8

[56] References Cited

U.S. PATENT DOCUMENTS

| | | | |
|---|---|---|---|
| 4,045,615 | 8/1977 | James et al. | 379/204 |
| 4,056,719 | 11/1977 | Waaben | 379/344 |
| 4,203,006 | 5/1980 | Mascia | 379/443 |
| 4,395,590 | 7/1983 | Pierce et al. | 379/442 |
| 4,417,099 | 11/1983 | Pierce | 379/412 |
| 4,592,069 | 5/1986 | Redding | 375/8 |
| 4,864,605 | 9/1989 | Ramsay et al. | 379/379 |
| 5,245,654 | 9/1993 | Wilkison et al. | 379/405 |
| 5,280,526 | 1/1994 | Laturell | 379/405 |
| 5,291,545 | 3/1994 | Stahl | 379/98 |
| 5,369,687 | 11/1994 | Farkas | 379/98 |
| 5,377,260 | 12/1994 | Long | 378/98 X |

*Primary Examiner*—Jeffery Hofsass
*Assistant Examiner*—Scott L. Weaver

[57] ABSTRACT

Isolation and interconnection of a telephone network of tip and ring lines and the analog ports of a modem are achieved with a transhybrid that incorporates optically-coupled isolation stages. Optical isolators connect to the tip and ring lines to provide optimal isolation and unidirectional transfer of signals.

6 Claims, 4 Drawing Sheets

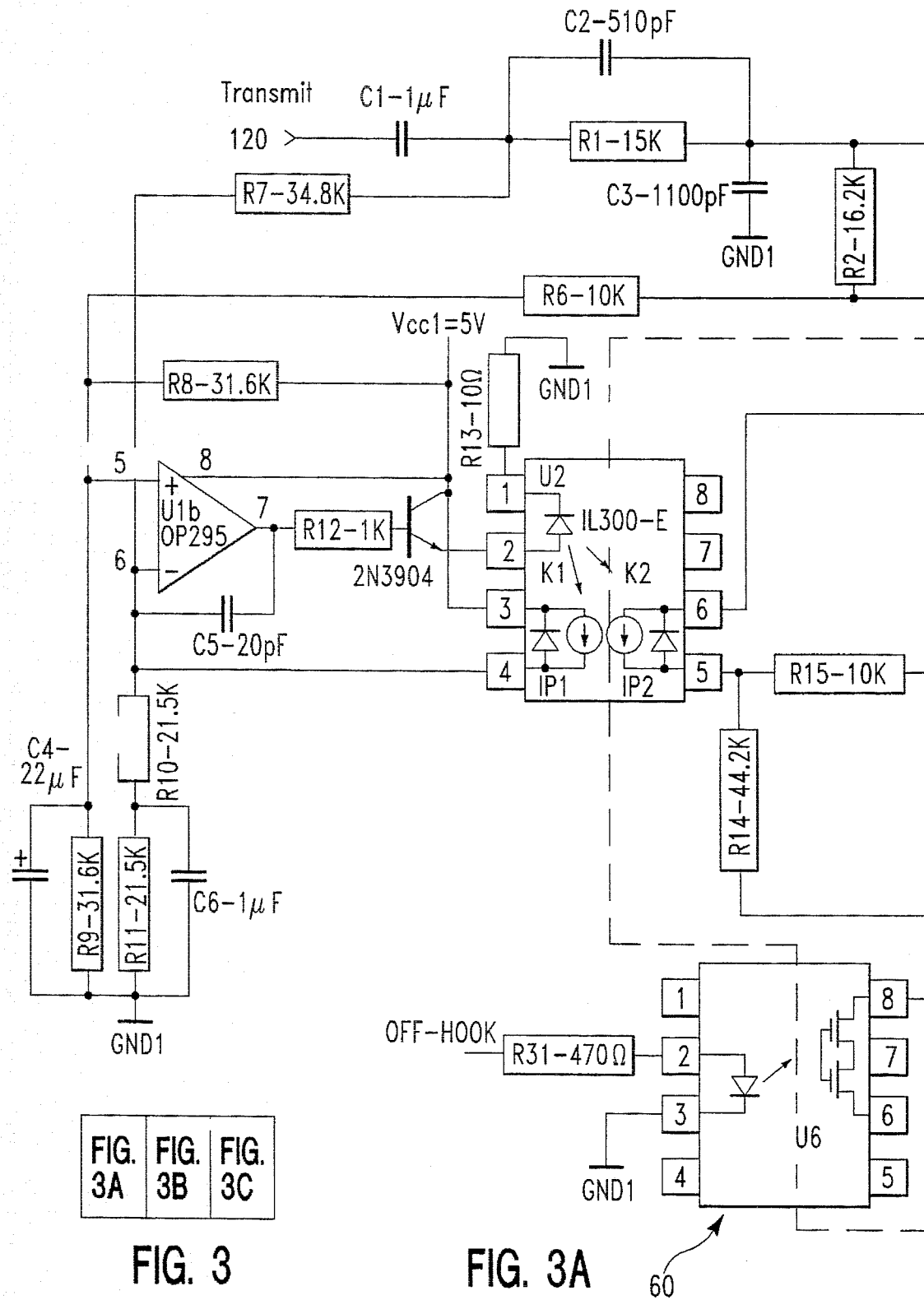

OPTICALLY-COUPLED DATA ACCESS ARRANGEMENT AND TRANSHYBRID

This is a divisional of application Ser. No. 08/191,841 filed Feb. 4, 1994.

FIELD OF THE INVENTION

This invention generally relates to telephone line communications. Specifically, the invention is directed to coupling devices for telephone subscriber equipment known as data access arrangements or DAAs.

BACKGROUND OF THE INVENTION

Telephone signals are provided to subscribers (customers) through the public switched telephone network. The subscriber portion of the network has two wires known as tip and ring, which carry the ring signal as well as the information being transferred. The bandwidth of the network is approximately 300 Hz to 3.3 kHz. Necessarily, any terminal equipment connected to this network must meet certain specifications in order to function properly.

To connect subscriber equipment such as data modems, facsimile machines, (non-cellular) portable telephones, speaker telephones, and message answering machines to the analog public switched telephone network, one must provide an interface or data access arrangement to bridge any incompatibilities between the network and the subscriber equipment. In addition to complying with network protocols, since the subscriber equipment are four-wire devices with separate transmit and receive pairs, the interface must separate the analog signals on the network into discrete transmit and receive signals (and vice versa). Finally, the interface must electrically isolate the telephone network from the subscriber equipment.

The interface must be transparent, so that from the vantage point of the central office, the line appears to be terminated in a conventional analog telephone set. Thus, the interface must simulate the D.C. continuity indicating the "off hook" condition when a call is received or placed. Typically, the separation function is performed by a circuit contained within the interface, called a 2-to-4 wire transhybrid.

For applications such as small portable computers and data entry devices, an interface having minimal volume and weight is ideal. However, the size cannot be arbitrarily reduced without impacting the performance. For example, some interface methods use isolation transformers to provide the required D.C. separation between the network and the subscriber, which offer wide bandwidth and transparency. However, transformers suited for this application suffer from being physically large, heavy, and costly, and therefore represent a poor choice for portable devices. If the transformer is eliminated from the interface, a substitute providing the requisite performance is needed.

An ideal interface or data access arrangement should offer a flat frequency response, constant group delay, extremely minimal amplitude and frequency distortion, and reflect the proper line impedance. It would be desirable to provide an interface not requiring the traditional line transformer but yet offers the same or a superior level of performance.

SUMMARY OF THE INVENTION

These and other objects are achieved by an interface that has a transhybrid circuit incorporating isolation. In addition to separating the transmit and receive signals, the transhybrid also provides D.C. isolation between the telephone network and the subscriber equipment. The embodiment disclosed here uses optical couplers to achieve the isolation. A group delay equalizer and a differential amplifier suppress the propagation of the transmit signal to the receive output.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION

Figure 1:
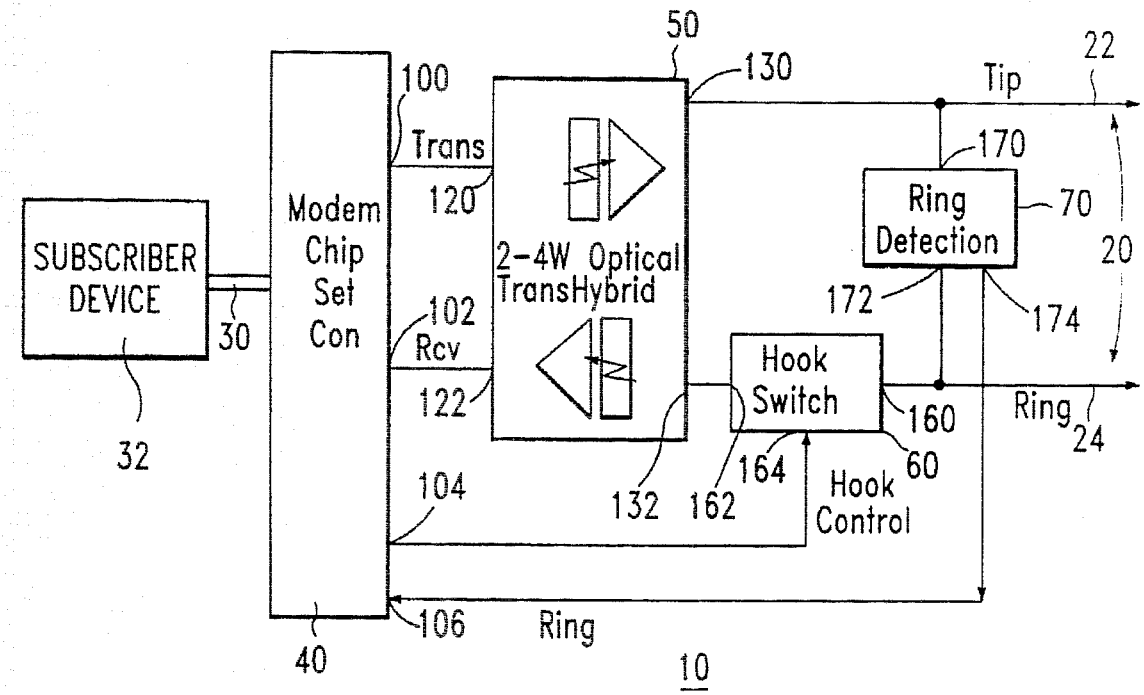
FIG. 1 is a schematic block diagram of a data access arrangement circuit.

The block diagram of FIG. 1 illustrates the configuration of a data access arrangement ("DAA") 10. The DAA 10 provides an interface between the public telephone network 20 (originating at the central office), with tip and ring lines 22 and 24, and the subscriber's digital data bus 30, in turn connected to subscriber equipment 32. The DAA 10 has a modem chip set or modem 40, an optically-coupled transhybrid circuit 50, a hook switch circuit 60, and a ring detection circuit 70.

The modem 40 converts the analog signals on the telephone line to a digital format compatible with the subscriber's equipment. The modem 40 has four ports: transmit 100, receive 102, hook switch control output 104, and ring detection input 106.

The optically-coupled transhybrid circuit 50 described here provides isolation between the telephone company network 20 and the subscriber's digital bus 30, and separates the transmit and receive signal paths. The transhybrid 50 has four ports: a transmit input port 120, a receive output port 122, and tip and ring line ports 130 and 132. The transhybrid 50 contains isolated transmit and receive networks that provide the return path for the central office loop current and the 2-to-4 wire separation function, and isolate the network 20 from the subscriber bus 30.

Signals originating in the subscriber equipment 32 (modem transmit signals) pass through the modem 40, exiting at the modem's transmit port 100, into the transhybrid 50 at the transmit input port 120, and exit at the tip and ring line ports 130 and 132, and onto the tip and ring lines 22 and 24.

Signals received from the telephone network 20 (i.e., from the central office) enter the transhybrid 50 at the tip and ring line ports 130 and 132, pass through the transhybrid 50, and exit the transhybrid 50 at the receive output port 122. The signals then pass into the modem 40 by way of the receive port 102.

The hook switch circuit 60 presents a D.C. continuity to the telephone network 20 when a call is in progress. The circuit 60 sits in the ring line 24 of the telephone network 20, connecting by line ports 160 and 162. It receives triggering from the modem 40 at its modem input 164.

Although such circuits have typically used an electromechanical relay to make the actual connection to the transhybrid 50, an optically-coupled FET solid state relay will perform the same function. The hook switch circuit 60 in effect connects the subscriber equipment 32 to the telephone network 20 when the subscriber places a call or the ring detection circuit 70 senses an incoming call, causing the subscriber equipment 32 to answer the call.

The ring detection circuit 70 straddles the tip and ring lines 22 and 24 of the telephone network 20, connecting to those lines at tip and ring line ports 170 and 172, respectively. One of the functions of the ring detection circuit 70 is to provide a signal to the subscriber equipment 32, indicating the presence of an incoming call. Here, the ring indication passes from a ring indication output 174 to the ring detection input 106 of the modem 40.

The Optically-Coupled Transhybrid

Figure 2:
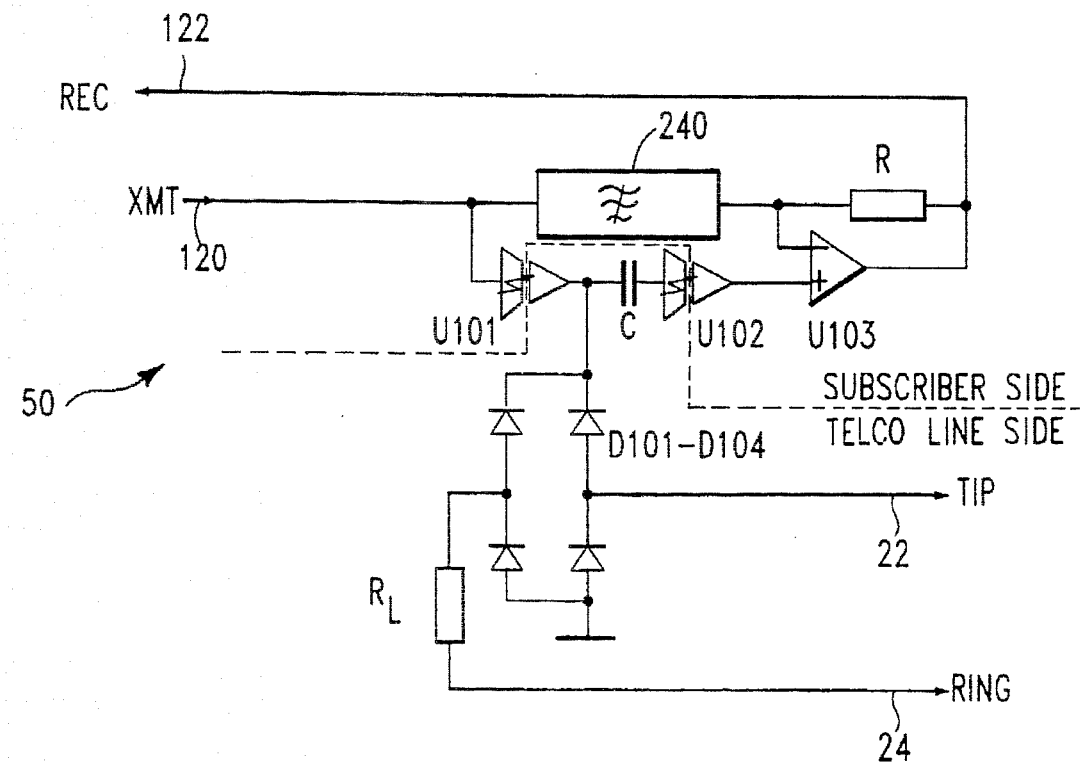
FIG. 2 is a schematic diagram of an optically-coupled transhybrid.

The optically-coupled transhybrid is shown in FIG. 2. The transhybrid 50 serves a dual function: it separates the modem transmit and receive signal paths and it provides isolation between the telephone network 20 and the subscriber equipment 32. The separation is achieved by suppressing the level of the modem transmit signal at the transhybrid's output 122 to the modem receive input 102.

The transhybrid 50 has three active elements: a first isolation amplifier U101, a second isolation amplifier U102, and a transmit suppression and receive amplifier U103. So that it will function as a difference amplifier, amplifier U103 is provided with a feedback resistor R. In keeping with the telephone network requirement that telephone signals remain at constant average amplitude, each amplifier has unity gain. A dashed line running through U101 and U102 delineates an isolation barrier between the subscriber side and the telephone network side of the transhybrid 50.

As shown in FIG. 2, the tip and ring lines 22 and 24 are connected across a diode bridge D101–D104 and a symbolic load resistor $R_L$. An incoming ("received") signal from the telephone network 20 enters the transhybrid 50 through the diode bridge D101–D104 and is coupled through capacitor C to the input of the second isolation amplifier U102.

The output of amplifier U102 is coupled to the non-inverting input of the transmit suppression and receive amplifier U103. The output voltage of amplifier U103 is equal to the difference between the voltages at the non-inverting and inverting inputs of the amplifier U103, multiplied by the open-loop gain of the amplifier. Since a signal is being received and the modem is not transmitting, no signal is present at the inverting input of amplifier U103. Thus, the received signal passes through amplifier U103 to the receive output port 122.

In the case of an outbound or modem transmit signal, the transmit input port 120 of the transhybrid 50 receives the output of the modem and passes it to the input of a first isolation amplifier U101 having unity gain. The output of the first isolation amplifier U101 is connected to the diode bridge D101–D104, which passes the modem transmit signal to the telephone network tip and ring lines and 24.

In addition to reaching the telephone network 20, the modem transmit signal also reaches both inputs of the transmit suppression and receive amplifier U103. It passes through capacitor C and second isolation amplifier U102 to the non-inverting input of amplifier U103. As a result of passing through amplifiers U101 and U102 and capacitor C, the signal arriving at the non-inverting input experiences group delay and frequency response distortion. For that reason, the signal is also passed through a group delay equalizer 240 to the inverting input of amplifier U103. The group delay equalizer 240 compensates for the signal's passage through amplifiers U101 and U102 and capacitor C by providing an equal delay and frequency response alteration such that the modem transmit signal at the inverting input of amplifier U103 is in phase with the signal appearing at the non-inverting input. Since the signals are equal in amplitude and in phase, they cancel or, in other words, the signal issuing from the group delay equalizer 240 suppresses the signal reaching the non-inverting input of the amplifier U103.

The effectiveness of the transhybrid 50 is determined by the following relationship:

$$\text{loss} = 20 \log \frac{V_R}{V_T}$$

where $V_T$ is the amplitude of the signal at the transmit input port 120, and $V_R$ is the amplitude of the signal at the receive output port 122.

When $V_T$ is much greater than $V_R$, there is high transhybrid loss, or rejection, which is desirable.

An Implementation of the Optically Coupled Transhybrid in a DAA

Figure 3B:
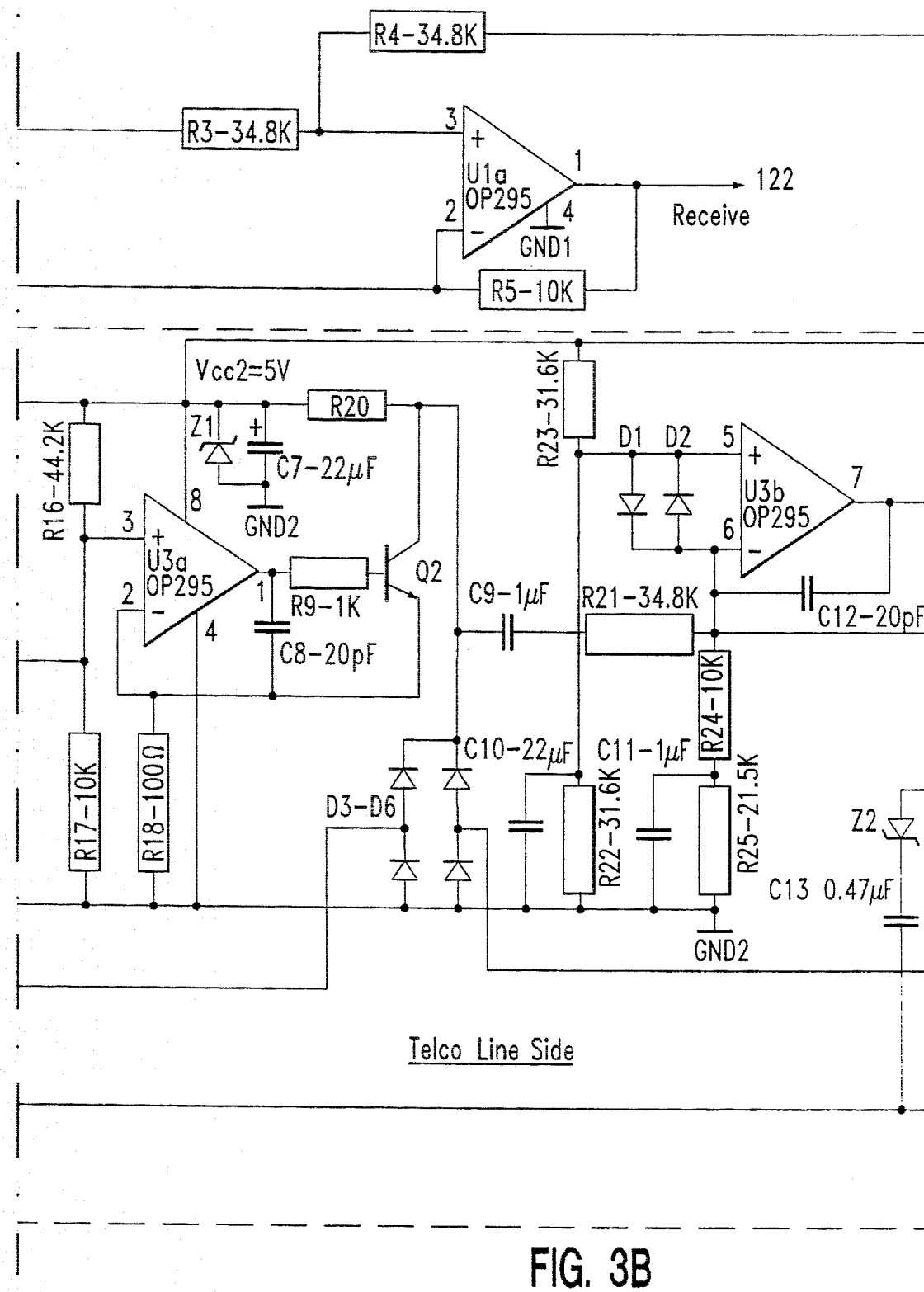
FIG. 3 is a schematic diagram of a data access arrangement circuit having an optically-coupled transhybrid.
Figure 3C:
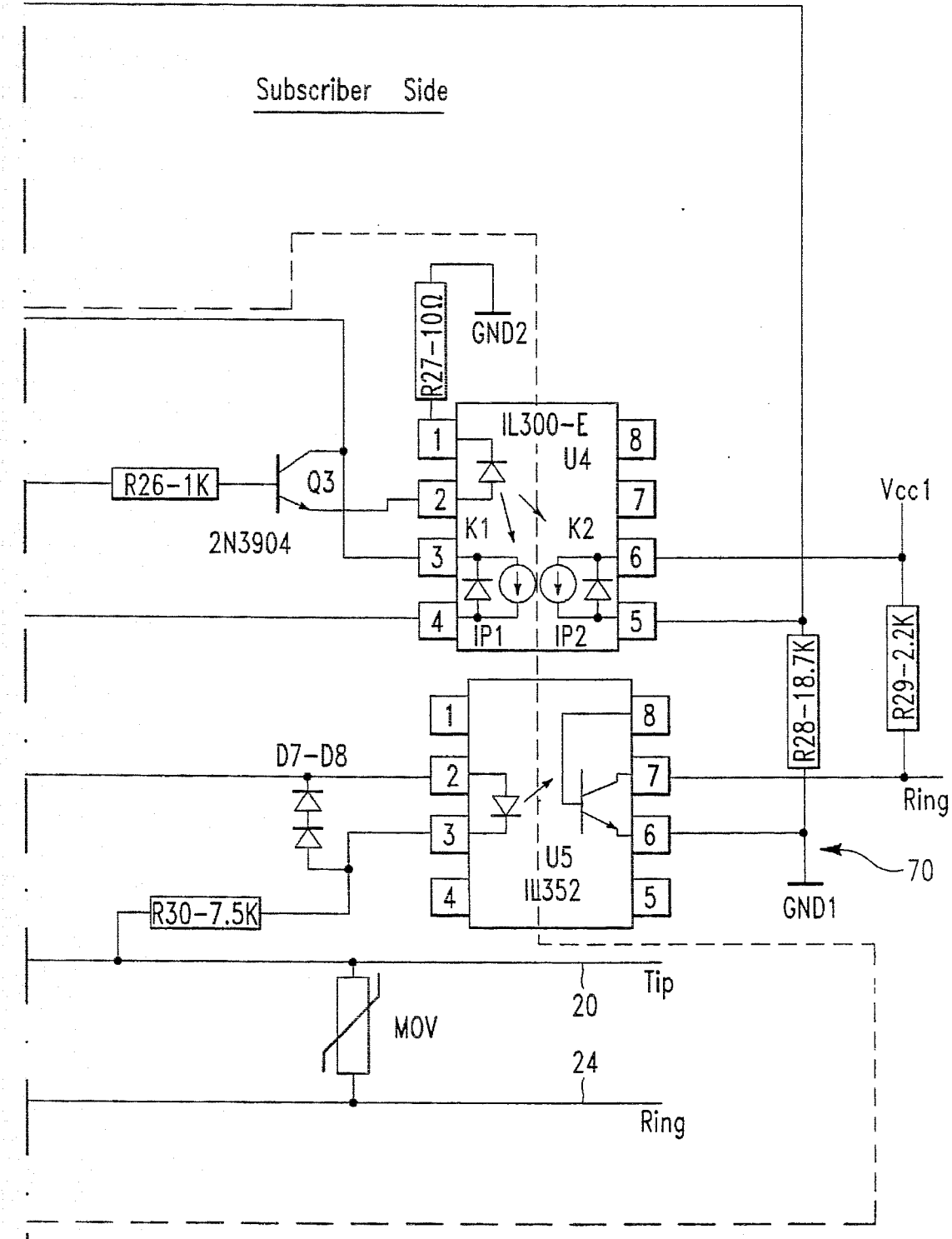

FIG. 3 is a detailed schematic of the optically-coupled transhybrid 50, the hook switch circuit 60, and the ring detection circuit 70. A dashed line denotes the intersection of the isolated subscriber equipment (labelled "subscriber side" in the figure) and telephone networks (called the "telco line side" in the figure). The explanation of the system of FIG. 3 will begin with a transmit signal from the subscriber equipment 32, followed by a discussion of the transfer of a signal received on the telephone network 20 to the subscriber equipment 32.

The modem transmit signal enters the transhybrid 50 through a coupling capacitor C1 and a resistor R7, passing to the inverting input of a differential amplifier U1b. The amplifier U1b, together with an optical coupler U2, a transistor Q1, a second differential amplifier U3a, and a second transistor Q2, function as the first isolation amplifier U101 of FIG. 2. The modem transmit signal is also applied to a group delay equalizer 240, consisting of resistors R1, R2, R3 and capacitors C2 and C3, as shown in the schematic of FIG. 3.

Amplifier U1b, transistor Q1, optical coupler U2, differential amplifier U3a, and transistor Q2 are collectively configured to exhibit unity gain. The inverting input of amplifier U1b is biased by a network of resistors R8 and R9 and capacitor C4.

The signal passes through differential amplifier U1b and is supplied to optical coupler U2 by transistor Q1 connected as an emitter-follower amplifier. Resistors R12 and R13 decrease the open-loop gain of transistor Q1 by limiting circuit bandwidth and current, thus providing overall stability. Coupler U2 has a feedback photodiode P1 connected to coupler terminals 3 and 4; a "rail-splitter" network of resistors R10 and R11 and capacitor C5 supplies the feedback photocurrent for the photodiode P1 and is connected to the non-inverting input of amplifier U1b.

The signal appearing at the output of coupler U2 at coupler terminals 5 and 6 is connected through a resistor network R14-R15-R16-R17 to the non-inverting input of amplifier U3a. A resistor R18 connected to the inverting input of the amplifier U3a controls the gain of the amplifier.

The combination of a resistor R20, a capacitor C7, and a zener diode Z1 functions as a power supply for amplifier U3a.

The signal at the output of amplifier U3a is coupled through a resistor R19 to transistor Q2. The output of Q2 is coupled to a diode bridge D3–D6, which in turn is connected to the tip and ring lines 22 and 24, completing the path from the transmit input port 120 to the telephone network 20.

The transmit signal present at the output of transistor Q2 will also attempt to reach the receive output port 122 of this circuit. It passes through a coupling capacitor C9 and a resistor R21 to the inverting input of a third differential amplifier U3b. A pair of back-to-back diodes D1–D2 across the inverting and non-inverting inputs of amplifier U3b protects the amplifier from excessive voltages. The amplifier U3b is biased at its non-inverting input by a network of resistors R22 and R23 and capacitor C10.

The signal at the output of amplifier U3b is coupled to a transistor Q3. As with transistor Q1, resistors R26 and R27 decrease the open-loop gain of transistor Q3 by limiting circuit bandwidth and current, thus providing overall stability for that transistor.

Configured as an emitter-follower amplifier, transistor Q3 drives the LED in an optical coupler U4. Coupler U4 has a feedback photodiode P1 connected to coupler terminals 3 and 4; a "rail-splitter" network of resistors R24 and R25 and capacitor C11 supplies the feedback photocurrent for the photodiode P1. The feedback is appropriately supplied to the non-inverting input of amplifier U3b.

Amplifier U3b, transistor Q3, and coupler U4 function collectively as the second isolation amplifier U102 of FIG. 2. As with the components comprising amplifier U101, the gain through this path is also unity.

The output of optical coupler U4 is a current that develops a voltage across resistor R28. This voltage is coupled through a resistor R4 to the non-inverting input of a transmit suppression and receive amplifier U1a, represented by amplifier U103 in FIG. 2. Simultaneously, the same signal that originated at the transmit input port 120 passes through the group delay equalizer 240 to the non-inverting input of amplifier U1a. A feedback resistor R5 is connected between the amplifier's non-inverting input and output while a resistor R6 provides bias from the supply voltage to the non-inverting input of amplifier U1a.

The equalizer 240 assures that the transmit signals appearing at the inverting and non-inverting inputs of the transmit suppression and receive amplifier U1a arrive in-phase with respect to each other. Since the voltages at the two inputs are also of the same amplitude, the two signals effectively cancel and the net output of amplifier U1a is zero.

Receiving a Signal on the Telephone Network

If a signal is received on the telephone network 20, it enters through the diode bridge D3–D6, proceeds through capacitor C9 to amplifier U3b, transistor Q3, and optical coupler U4, and into the non-inverting input of amplifier U1a. Because the received signal does not reach the inverting input of amplifier U1a, the received signal effectively passes through amplifier U1a to the receive output port 122. Thus, the separation of the transmit and receive paths is accomplished along with an isolation of the telephone network 20 from the subscriber equipment 32.

Each of the amplifiers U1b, U3a, and U3b have respective feedback capacitors C5, C8, and C12 to control the roll-off response of the amplifiers.

The hook switch circuit 60 can be implemented with a commercially-available optical Coupler U5. The hook switch circuit 60 sits in the ring line 24, connected at coupler terminals 6 and 8. The control signal for the hook switch circuit 60 is received from the modem 40 (FIG. 1) through a resistor R31.

The ring detection circuit 70 can also be implemented with a commercially-available optical coupler U6. As shown, the ring detection circuit 70 straddles the tip and ring lines 22 and 24. A coupling capacitor C13 and zener diode Z2 connect to coupler terminal 2 of the coupler U6 while a resistor R30 connects to coupler terminal 3 of the coupler U6. A pair of diodes D7–D8 in series across coupler terminals 2 and 3 will discharge any voltage buildup on the coupling capacitor C13. With aid of a pull-up resistor R29, the output of the circuit is supplied at coupler terminal 7.

The hook switch circuit 60 and the ring detection circuit 70 are connected to a subscriber isolated ground GND1; this ground is isolated from the isolated ground GND2 grounding the diode bridge D3–D6. This also implies isolated power supplies—one supply $Vcc_1$ is on the subscriber side; another $V_{CC2}$ is on the telephone network side. For protection at the telephone network 20 input to the DAA 10, a metal-oxide varistor MOV can be placed across the tip and ring lines 22 and 24.

The devices described here are based in part on the technology used in the Siemens®IL300 family of aluminum gallium arsenide (AlGaAs) linear optocouplers, discussed in the Siemens Optoelectronics Data Book 1993, pp. 5–115 through 5–122, and pp. 11–177 through 11–193. It should be understood that other devices can be used.

Instead of the specific implementation shown in FIG. 3, one could implement the DAA and the optically-coupled transhybrid using other discrete and/or integrated solutions such as hybrid microcircuits. Also, the DAA and transhybrid can be implemented with digital signal processing (DSP) techniques, representing the separation/suppression and isolation functions as an algorithm (or a series of algorithms).

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A data access arrangement for interconnecting a telephone network of tip and ring lines and a subscriber digital data bus, comprising:

a modem for bidirectionally converting analog signals to digital signals, having a bidirectional digital bus port for connection to the subscriber digital data bus, an analog transmit port, and an analog receive port; and means for connecting the modem to the telephone network and isolating the modem from the telephone network, the means for connecting and isolating having first means for transferring signals received on the tip and ring lines of the telephone network to the analog receive port of the modem and suppressing signals originating at the analog transmit port of the modem, the first means having an output provided to the analog receive port of the modem;

second means for isolating the tip and ring lines of the telephone network from the modem and transferring signals originating at the analog transmit port of the modem to the tip and ring lines of the telephone network, the second means being connected between the analog transmit port of the modem and the tip and ring lines of the telephone network; and third means for isolating the tip and ring lines of the telephone network from the modem and transferring signals received on the tip and ring lines of the telephone network, the third means being connected between the tip and ring lines of the telephone network and the first means, 2. The apparatus as set forth in claim 1, wherein the second and third means are optical isolators.

3. The apparatus as set forth in claim 1, wherein the first means includes a differential amplifier having a first input connected to the third means;

a second input responsive to the analog transmit port of the modem; and an output provided to the output of the analog receive port of the modem.

4. The apparatus as set forth in claim 3, wherein the first means further includes equalizing means for controlling group delay and amplitude with respect to frequency, the equalizing means being connected between the analog transmit port of the modem and the second input of the differential amplifier.

5. A communications apparatus for transmitting and receiving signals on a telephone network of tip and ring lines, comprising:

a subscriber device, the subscriber device having a port for transmitting and receiving signals on a digital data bus; and a data access arrangement for interconnecting the telephone network of tip and ring lines and the subscriber device, the data access arrangement having:

a modem for bidirectionally converting analog signals to digital signals, having a bidirectional digital bus port for connection to the digital data bus, an analog transmit port, and an analog receive port; and a transhybrid having a transmit suppression and receive amplifier having a first input, a second input responsive to signals originating at the analog transmit port of the modem, and an output provided to the analog receive port of the modem;

a first optical isolator connected between the analog transmit port of the modem and the tip and ring lines of the telephone network; and a second optical isolator connected between the tip and ring lines of the telephone network and the first input of the transmit suppression and receive amplifier.

6. The apparatus as set forth in claim 5, further including a group delay equalizer connected between the analog transmit port of the modem and the second input of the transmit suppression and receive amplifier.

* * * * *